United States Patent
Wiebe

(10) Patent No.: US 9,885,482 B1
(45) Date of Patent: Feb. 6, 2018

(54) METHOD OF MAKING AN AERO-DERIVATIVE GAS TURBINE ENGINE

(71) Applicant: Siemens Energy, Inc., Orlando, FL (US)

(72) Inventor: David J. Wiebe, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 15/355,665

(22) Filed: Nov. 18, 2016

Related U.S. Application Data

(62) Division of application No. 13/252,348, filed on Oct. 4, 2011, now abandoned.

(51) Int. Cl.
*F02C 3/04* (2006.01)
*F23R 3/46* (2006.01)

(52) U.S. Cl.
CPC .......... *F23R 3/46* (2013.01); *F02C 3/04* (2013.01); *F05D 2230/80* (2013.01)

(58) Field of Classification Search
CPC ....... F23R 3/44–3/50; F02C 3/04; F02C 3/14; F02C 3/16; F05D 2230/80
See application file for complete search history.

(56) References Cited

U.S. PATENT DOCUMENTS

| | | |
|---|---|---|
| 4,808,235 A | 2/1989 | Woodson et al. |
| 5,133,180 A | 7/1992 | Horner et al. |
| 6,220,034 B1 | 4/2001 | Mowill |
| 6,374,594 B1 | 4/2002 | Kraft et al. |
| 6,608,395 B1 | 8/2003 | Steinway |
| 6,884,029 B2 | 4/2005 | Beeck |
| 6,931,856 B2 | 8/2005 | Belokon et al. |
| 7,721,547 B2 | 5/2010 | Bancalari et al. |
| 9,127,554 B2 * | 9/2015 | Charron ............... F01D 9/023 |
| 2002/0157400 A1 | 10/2002 | Schulten et al. |
| 2007/0107436 A1 | 5/2007 | Evulet |
| 2007/0107437 A1 | 5/2007 | Evulet et al. |
| 2010/0037617 A1 | 2/2010 | Charron et al. |
| 2010/0077719 A1 | 4/2010 | Wilson et al. |
| 2010/0180605 A1 | 7/2010 | Charron |
| 2011/0146290 A1 | 6/2011 | Vernet et al. |
| 2011/0203282 A1 | 8/2011 | Charron et al. |

(Continued)

FOREIGN PATENT DOCUMENTS

CN 1505745 A 6/2004

*Primary Examiner* — Jun Yoo

(57) ABSTRACT

A method of making an aero-derivative gas turbine engine (100) is provided. A combustor outer casing (68) is removed from an existing aero gas turbine engine (60). An annular combustor (84) is removed from the existing aero gas turbine engine. A first row of turbine vanes (38) is removed from the existing aero gas turbine engine. A can annular combustor assembly (122) is installed within the existing aero gas turbine engine. The can annular combustor assembly is configured to accelerate and orient combustion gasses directly onto a first row of turbine blades of the existing aero gas turbine engine. A can annular combustor assembly outer casing (108) is installed to produce the aero-derivative gas turbine engine (100). The can annular combustor assembly is installed within an axial span (85) of the existing aero gas turbine engine vacated by the annular combustor and the first row of turbine vanes.

5 Claims, 4 Drawing Sheets

(56) References Cited

U.S. PATENT DOCUMENTS

2013/0081407 A1\* 4/2013 Wiebe ............... F01D 9/023
60/805
2014/0060001 A1\* 3/2014 Beeck ............... F02C 3/14
60/39.37

\* cited by examiner

METHOD OF MAKING AN AERO-DERIVATIVE GAS TURBINE ENGINE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to aero gas turbine engines converted to an aero-derivative gas turbine engine used to generate electrical power. In particular, this invention relates to using an advanced transition duct combustion assembly in an aero-derivative gas turbine engine.

BACKGROUND OF THE INVENTION

Aero-derivative gas turbine engines are hybrid gas turbine engines that typically take a compressor, a combustion system, and a turbine from a gas turbine engine used in an aeronautical application, such as powering an aircraft, and combine it with a power turbine to drive an electrical generator. Typically the turbine in an aero engine is designed to drive only the compressor, and it exhausts combustion gasses at a pressure sufficiently high to propel an aircraft due to the pressure difference between the engine exhaust and ambient air. For aero-derivative applications, a power turbine is added to the turbine of the aero engine to harness extra energy from the combustion gasses prior to exhaust in order to drive an electrical generator for the generation of electrical power.

The aero engine, the power turbine, and the generator may be connected in various configurations. In a first configuration the power turbine is not connected to the aero engine, but simply receives exhaust from the aero engine and that exhaust provides the energy to rotate the power turbine. In this configuration a power turbine shaft is an additional shaft and it connects the power turbine to the generator. In a second configuration the aero engine and the power turbine may be rotationally connected. The connection may be accomplished by replacing a low pressure shaft of the aero engine with an aero-derivative low pressure shaft. The aero-derivative low pressure shaft may extend further aft through the power turbine and be supported by an additional bearing set aft of the power turbine. In order to connect the generator, the aero-derivative shaft may extend further aft to a downstream disposed generator. Alternately, an upstream end of the shaft may extend further upstream to an upstream disposed generator. In both variations of the second configuration the power turbine shaft is the same as the low pressure shaft.

Aero-derivative engines are often used to provide electrical power for small installations or to provide supplemental power for generation facilities during periods of increased demand. They may be used to supplement industrial gas turbine engine electricity production, or they may be standalone. In a standalone configuration it is common to assemble two aero-derivative engines to one generator for power generation. One such configuration would entail one aero-derivative engine configured to rotate in a first direction (for example, having right hand blades) and have a power turbine shaft extend aft to connect to a first end of a generator shaft. A second aero-derivative engine configured to rotate in the opposite direction (for example, having left hand blades) may have a power turbine shaft extend aft to connect to a second end of the same generator shaft. In this configuration both aero-derivative engines are exhausting toward each other, but are rotation in the same direction with respect to the generator. The result is that the power turbine shaft of the first aero-derivative engine is connected to a generator through-shaft, which is also connected to the power turbine shaft of the second aero-derivative engine. Whether or not the respective power turbine shaft is connected to the low pressure shaft of the respective engine depends on the configuration of the respective gas turbine engine as described earlier. Aero gas turbine engines are smaller, lighter, and portable, whereas industrial gas turbine engines typically used to generate power are larger, heavier, and not portable. However, in order to be smaller and lighter, aero-derivative gas turbine engines are typically made of more expensive, less durable materials. Further, combustion in annular combustors typically used in aero engines is purposefully robust to ensure a reliable flame under variable engine demand conditions, but as a result, aero gas turbine engines commonly generate greater levels of pollutants such as NOx than their industrial counterparts. Additionally, maintenance of aero-derivative engines may be more frequent and difficult than for industrial gas turbine engines. Consequently, there remains room for improvement in the art.

DETAILED DESCRIPTION OF THE INVENTION

Figure 1:
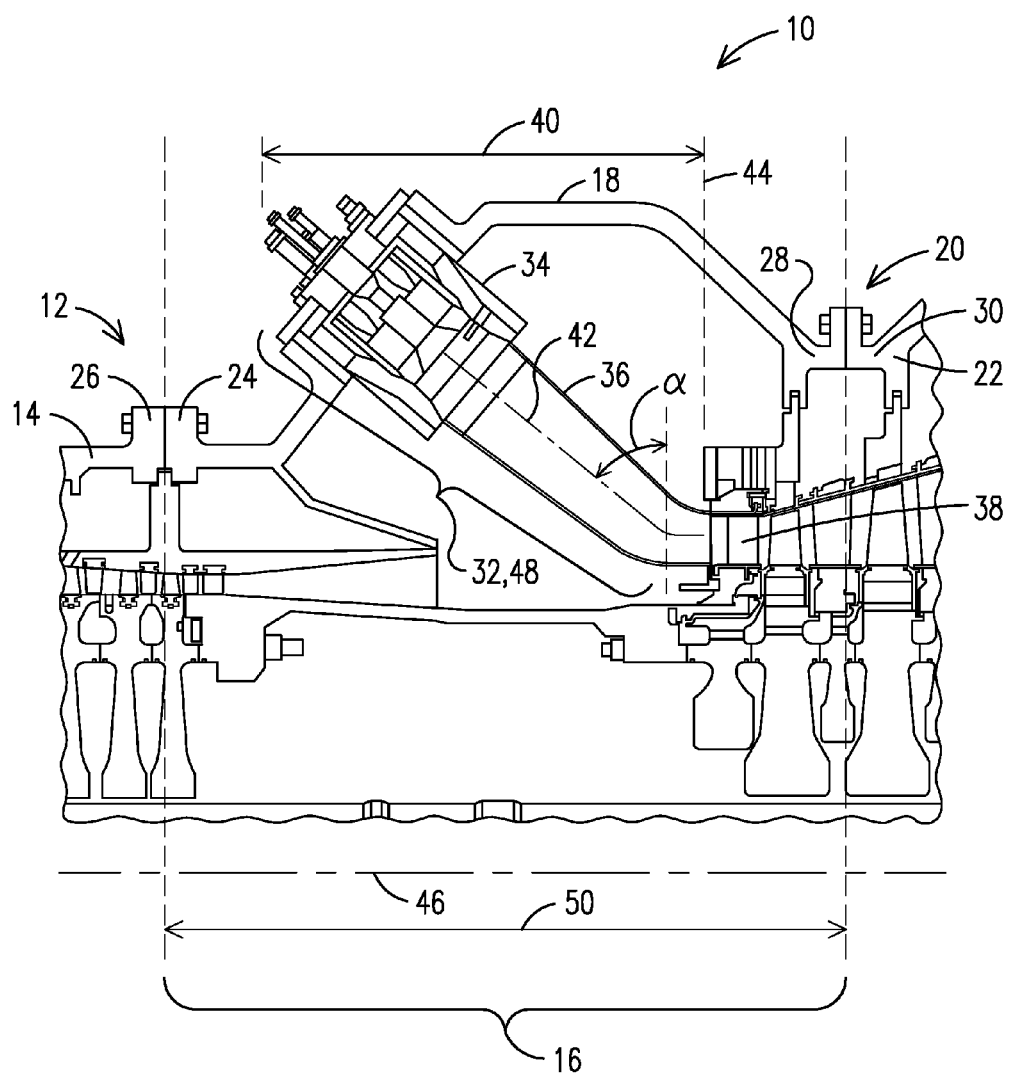
FIG. 1 is a cross-sectional illustration of a prior art conventional can annular industrial gas turbine engine.

The core of an aero engine includes an aero high pressure compressor, an aero combustor, an aero high pressure turbine, an aero high pressure shaft interconnecting the aero high pressure compressor to the aero high pressure turbine, an aero high pressure shaft bearing arrangement, and a power take-off associate with the aero high pressure shaft and the aero high pressure shaft bearings. The configuration of the core of the aero engine is driven in large part by the shaft dynamics of the aero high pressure shaft, which are, in turn, greatly influenced by the length of the aero high pressure shaft. A change in the length of the aero high pressure shaft would require a substantial redesign of the aero engine core. However, an industrial can annular combustor occupies more axial length than can fit between the aero high pressure compressor and the aero high pressure turbine. Thus, up to this point it has been impractical to replace an annular combustor of the aero engine with an industrial can annular combustion system, since it would entail the major redesign of the core of the aero engine.

Advances in combustion systems used in can annular gas turbine engines have produced advanced transition duct designs where a first row of vanes commonly present in conventional gas turbine engines is eliminated. Instead, combustion gasses from combustion can flow along a discrete straight flow path from the combustor until accelerated up to a speed appropriate for delivery to the first row of turbine blades. In some advanced transition duct designs the combustion gasses continue on a straight flow path when delivered to the first row of turbine blades. In other advanced transition duct designs the combustion gasses unite with combustion gasses from adjacent combustors and a single unified flow is delivered to the first row of turbine blades. In the advanced transition duct designs, the combustors are disposed radially further out than combustors in a conventional industrial gas turbine engine. However, an axial length of the advanced combustion system is shorter than an axial length of a conventional combustion system. An example of such an advanced transition duct is disclosed in U.S. Pat. No. 7,721,547 to Bancalari et al.

The present inventor has recognized that an axial length of the advanced can-annular combustion system is such that it will fit between the aero high pressure compressor and the aero high pressure turbine of the aero engine designed for use with an annular combustor without having to alter the other components of the core of the aero engine, whereas a conventional can annular combustion system would not. This is possible because the advanced can-annular combustion system will fit within an axial span of an aero engine that was formerly occupied by the aero annular combustor and the aero first row of turbine vanes. As a result, the present inventor has conceived of a modified aero-derivative engine where the annular aero combustor is replaced by an advanced can annular combustion system without a need to alter the other components of the core of the aero engine. The modified aero-derivative engine maintains its desirable small size and portability, but gains a combustion system that is more durable, easier to maintain, and generates reduced levels of pollutants such as NOx. The modified aero-derivative engine can be made from core aero engine components configured to be assembled together with an aero annular combustor, or it can be made as a retrofit of an existing (already assembled) aero engine or an existing aero-derivative engine. Modifications may or may not be made to non-core components, including the aero low pressure compressor, the aero low pressure turbine, the aero low pressure shaft, and/or the aero low pressure bearing arrangement. If modifications are made to any of these components, changes may or may not be necessary to the respective aero casing sections to accommodate the modifications.

Advantageously, the replacement of an aero annular combustor with an advanced industrial gas turbine combustion system may simplify maintenance requirements as well. Specifically, the advanced combustion system comprises a plurality of combustors and advanced transition ducts that can be assembled and disassembled on site. In contrast, the aero annular combustor typically associated with an aero engine may require removal of an entire combustion section outer casing and the aero annular combustor may need to be sent to a repair facility for repairs. As a result, the advanced combustion system may be easier to disassemble and to service on-site, resulting in a decrease in maintenance costs.

The present inventor has also recognized that an industrial gas turbine advanced combustion system eliminates a need for a first row of stationary turbine vanes (airfoils) commonly present in an aero engine, and that this first row of turbine blades is customarily supported by the aero combustor outer casing. Thus, when the aero combustor outer casing is removed, the first row of turbine vanes may be removed as well. If no modifications have been made to the existing aero compressor outer casing and the existing aero turbine outer casing, then installation of the advanced combustion system may then be accomplished by simply installing the advanced combustion system within the existing combustor section, and installing an outer casing suitable for encasing the advanced combustion system, (hereafter referred to as the aero-derivative outer casing), in a manner such that it will match up with the existing aero compressor outer casing and the existing aero turbine outer casing. Other modifications may be made as desired. For example, the aero inner casing may be replaced by an aero-derivative inner combustor casing having a generally larger diameter, since the aero inner casing would necessarily be shaped with a small diameter to provide room for the surrounding annular aero combustor. The inventor has recognized that the more radially outwardly extending orientation of an advanced combustion system provides this unexpected additional advantage when used in an aero-derivative engine.

Turning to the figures, FIG. 1 shows a prior art conventional can annular industrial gas turbine engine 10 comprising a conventional compressor section 12 comprising a conventional compressor outer casing 14, a conventional combustion section 16 comprising a conventional combustor outer casing 18, and a conventional turbine section 20 comprising a conventional turbine outer casing 22. The conventional combustor outer casing 18 is disposed between the conventional compressor outer casing 14 and the conventional turbine outer casing 22 such that an upstream end 24 of the conventional combustor outer casing 18 is secured to an aft end 26 of the conventional compressor outer casing 14, and an aft end 28 of the conventional combustor outer casing 18 is secured to an upstream end 30 of the conventional turbine outer casing 22.

The conventional can annular industrial gas turbine engine 10 utilizes a conventional combustion system 32 comprising a combustor 34 and a conventional transition duct 36, which feed combustion gasses to a first row of turbine vanes 38. Although the first row of turbine vanes 38 are functionally associated with the turbine, they are structurally associated with the conventional combustion section 16 because they are structurally secured to the conventional combustion section 16.

The conventional combustion system 32 occupies a conventional combustion system axial length 40, which is determined by a transition duct angle α formed by a conventional transition duct longitudinal axis 42 and a plane 44 perpendicular to an engine longitudinal axis 46, and a conventional combined length 48 of the combustor 34 and the conventional transition duct 36. In a conventional combustion system the transition duct angle α and combined length 48 are such that the conventional combustion system occupies a relatively large conventional combustion system axial length 40 when compared to an annular combustion system (not shown). The conventional combustion system axial length 40 thus necessitates the conventional combustor outer casing 18 comprise a conventional combustor outer casing axial length 50 sufficient to accommodate the combined length 48 of the combustor 34 and the conventional transition duct 36.

Figure 2:
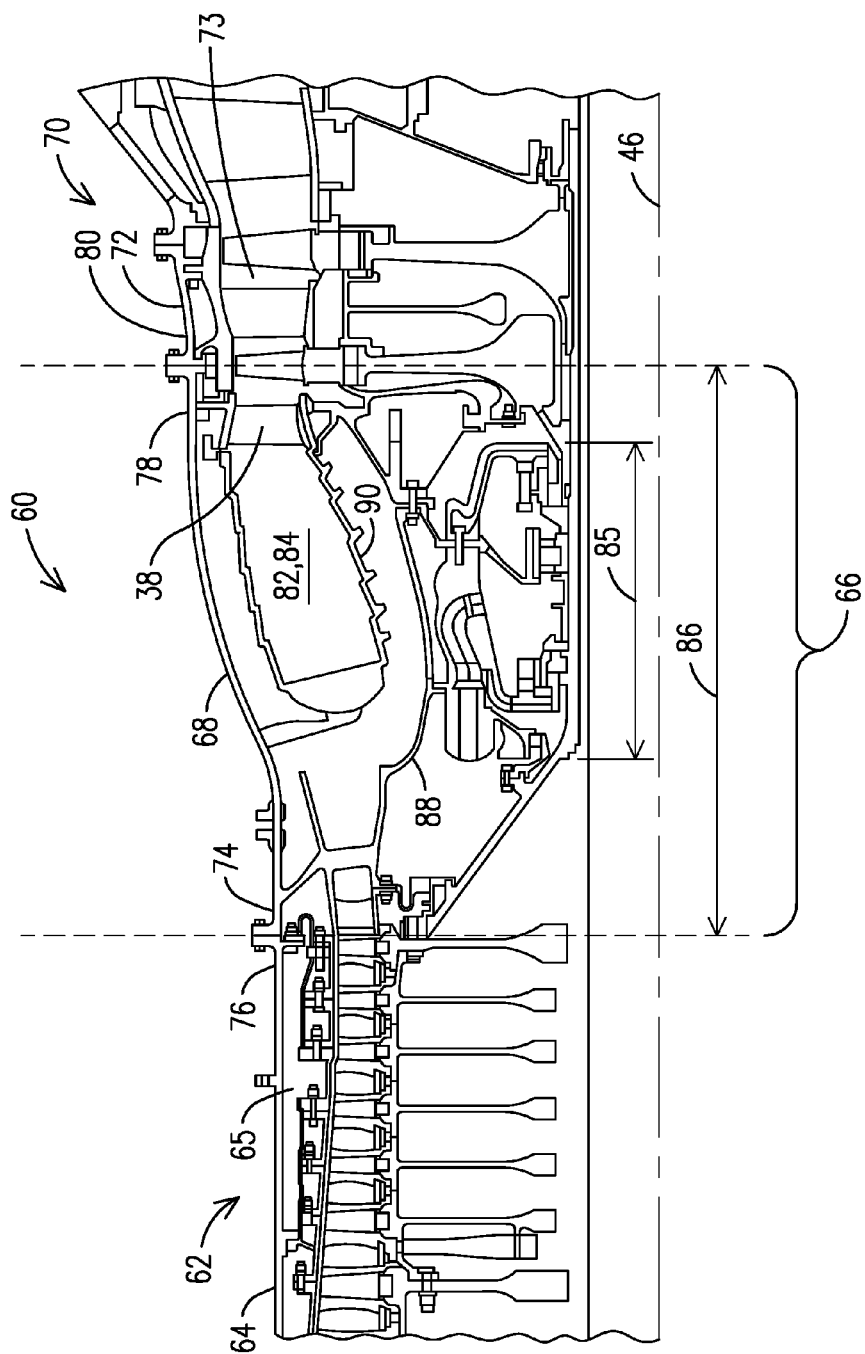
FIG. 2 is a cross-sectional illustration of a prior art aero gas turbine engine.

FIG. 2 depicts a prior art aero gas turbine engine 60 comprising an aero compressor section 62 comprising an aero compressor outer casing 64 and an aero high pressure compressor 65, an aero combustion section 66 comprising an aero combustor outer casing 68, and an aero turbine section 70 comprising an aero turbine outer casing 72 and an aero high pressure turbine 73. The aero combustor outer casing 68 is disposed between the aero compressor outer casing 64 and the aero turbine outer casing 72 such that an upstream end 74 of the aero combustor outer casing 68 is secured to an aft end 76 of the aero compressor outer casing 64, and an aft end 78 of the aero combustor outer casing 68 is secured to an upstream end 80 of the aero turbine outer casing 72.

The aero gas turbine engine 60 utilizes an aero combustion system 82 comprising an aero annular combustor 84 that feeds combustion gasses to a first row of turbine vanes 38 associated with the aero high pressure turbine 73. Here, as in the conventional combustion section, the first row of turbine vanes 38 is structurally associated with the aero compressor outer casing 64.

The aero combustion system 82 occupies a span of aero combustion system axial length 85. In an aero combustion system 82 the aero annular combustor 84 occupies a relatively small aero combustion system axial length 85 when compared to the conventional combustion system axial length 40 of the conventional combustion system 32 of FIG. 1. As a result, an aero combustor outer casing axial length 86 may be relatively shorter than the conventional combustor outer casing axial length 50. Consequently, result it would not be possible to remove the aero annular combustor 84 and replace it with a conventional combustion system 32 without redesigning the aero gas turbine engine 60 to accommodate the increased axial length of the conventional combustion system 32. Also visible in FIG. 2 is an aero annular combustor inner casing 88 that comprises a small diameter in order to permit space on an inner side 90 of the aero annular combustor 84 for air to flow.

Figure 3:
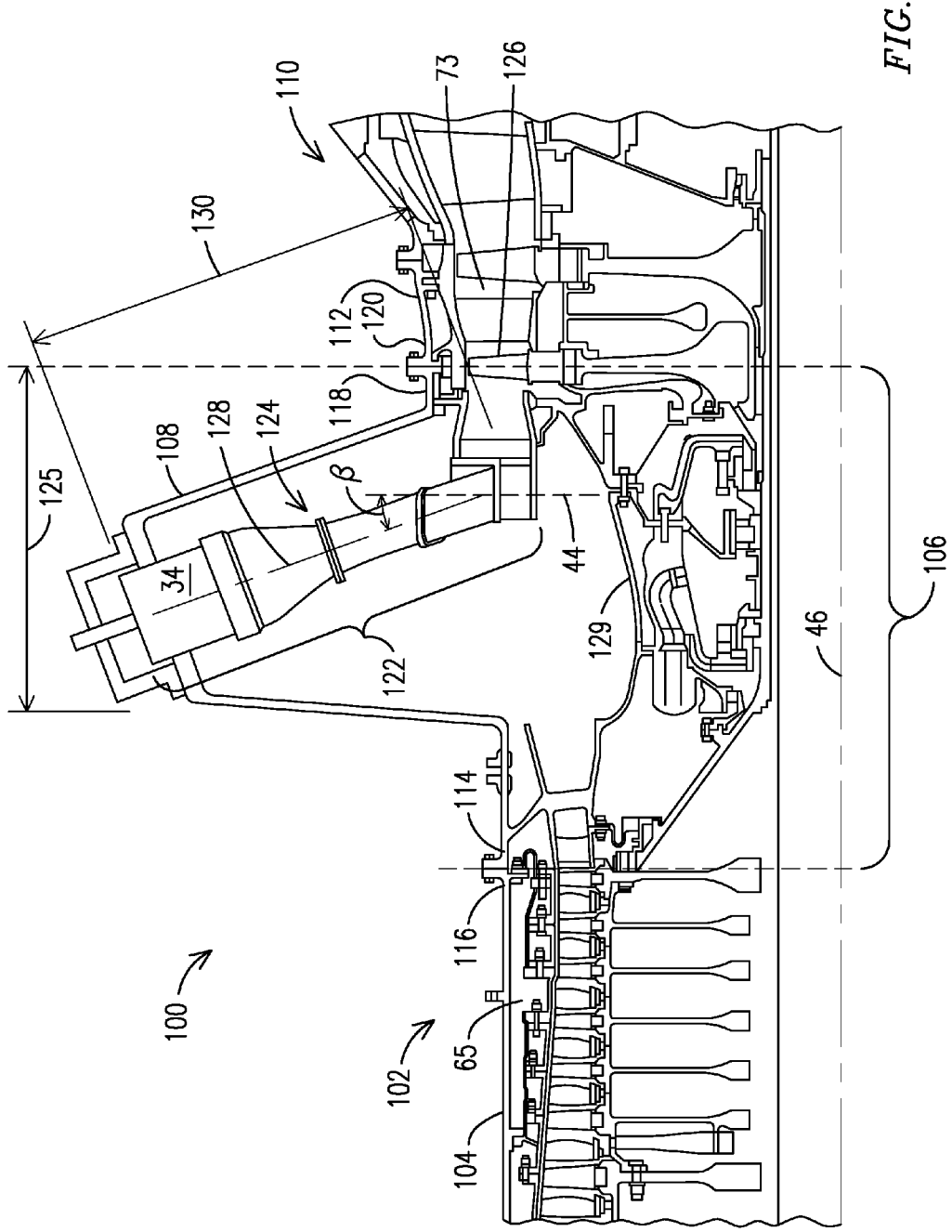
FIG. 3 is a cross-sectional illustration of an aero-derivative gas turbine engine in accordance with aspects of the invention.

The present inventor has recognized that emerging combustion systems designs include advanced transition duct combustion systems utilizing combustors and advanced transition ducts comprising an axial length short enough that the advanced combustion systems may be used to replace the annular aero combustor system 82 in an aero gas turbine engine 60 to create an aero-derivative gas turbine engine 100 as shown in FIG. 3, without significant design changes to the aero gas turbine engine 60. The aero-derivative gas turbine engine 100 comprises an aero-derivative compressor section 102 comprising an aero-derivative compressor outer casing 104 and an aero high pressure compressor 65, an aero-derivative combustion section 106 comprising an aero-derivative combustor outer casing 108, and an aero-derivative turbine section 110 comprising an aero-derivative turbine outer casing 112 and an aero high pressure turbine 73. If the aero low pressure compressor (not shown) is not modified then the aero-derivative compressor outer casing 104 may be the same as the aero compressor outer casing 64. Likewise, if the aero low pressure turbine (not shown) is not modified then the aero-derivative turbine outer casing 112 may be the same as the aero turbine outer casing 72. It can be seen that the first row of turbine vanes 38 (not shown) is absent in the aero-derivative gas turbine engine 100 disclosed in FIG. 3.

The aero-derivative combustor outer casing 108 is disposed between the aero-derivative compressor outer casing 104 and the aero-derivative turbine outer casing 112 such that an upstream end 114 of the aero-derivative combustor outer casing 108 is secured to an aft end 116 of the aero-derivative compressor outer casing 104, and an aft end 118 of the aero-derivative combustor outer casing 108 is secured to an upstream end 120 of the aero-derivative turbine outer casing 112.

The aero-derivative gas turbine engine 100 utilizes an advanced can annular combustion assembly 122 comprising a combustor 34 and an advanced transition duct 124. The advanced transition duct 124 properly orients and accelerates the combustion gasses for delivery to a first row of turbine blades 126. Consequently, the first row of turbine vanes 38 present in the conventional can annular industrial gas turbine engine 10 and aero gas turbine engine 60 are no longer needed. Since the first row of turbine vanes 38 are supported in the prior art by the respective combustor outer casings, which may not be used in the aero-derivative gas turbine engine 100, they can be removed with little consequence. Thus, it can be seen that the aero-derivative gas turbine engine 100 of FIG. 3 utilizes the aero gas turbine engine core but without the first row of turbine vanes 38 and without the aero annular combustor 84.

The advanced can annular combustion assembly 122 occupies an advanced can annular combustion system axial length 125, which is determined by an advanced transition duct angle β formed by an advanced transition duct longitudinal axis 128 and a plane 44 perpendicular to an engine longitudinal axis 46, and an advanced combined length 130 of the combustor 34 and the advanced transition duct 124. In an advanced can annular combustion assembly 122 the transition duct angle β and the advanced combined length 130 are such that the advanced can annular combustion assembly 122 occupies a relatively small advanced can annular combustion system axial length 125 when compared to a conventional combustion system 32. The advanced can annular combustion system axial length 125 is such that an aero annular combustor 84 could be removed from an aero gas turbine engine 60 and the advanced can annular combustion assembly 122 could be placed in the aero combustion section 66 without having to change the aero combustion system axial length 85. The resulting aero-derivative gas turbine engine 100 thus need not be redesigned significantly. Further, since the advanced transition duct 124 is oriented more radially outward, there is more room available adjacent where the aero annular combustor inner casing 88 would be disposed.

Figure 4:
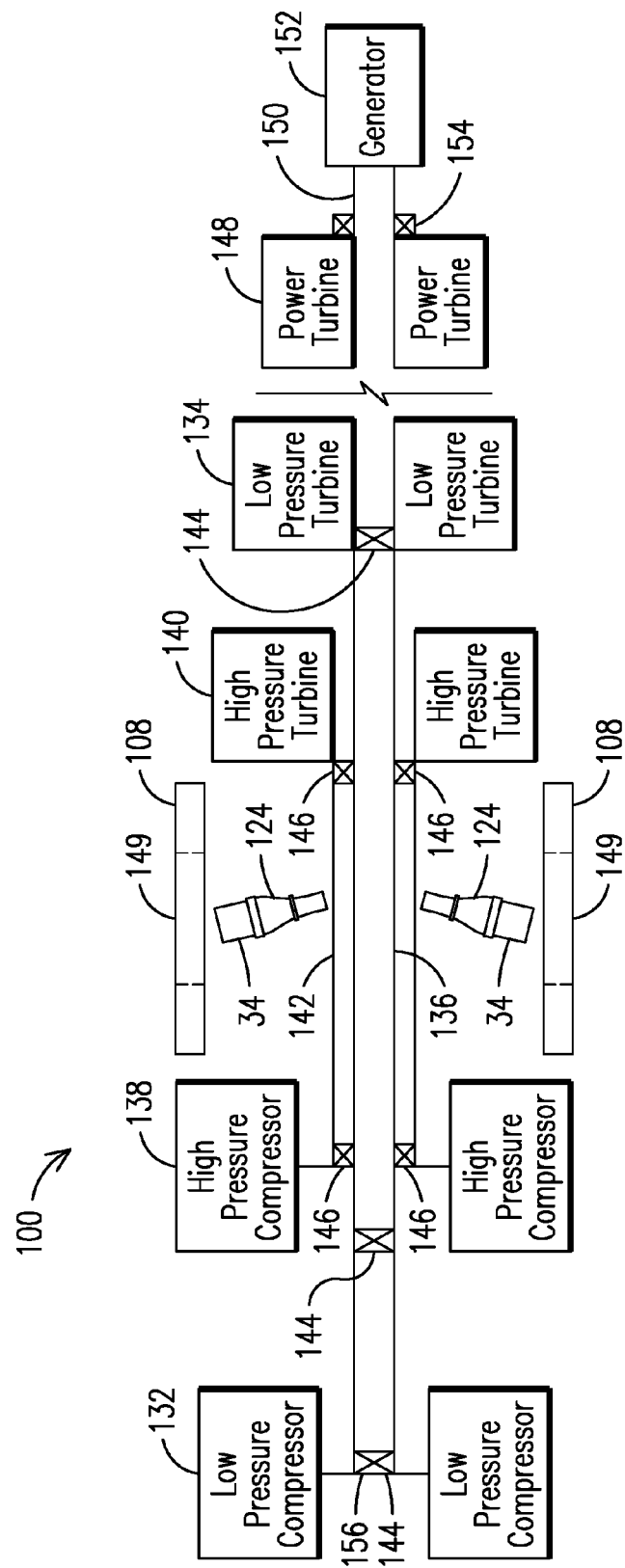
FIG. 4 is a schematic illustration of the aero-derivative gas turbine engine of FIG. 3.

As shown schematically in FIG. 4, the aero-derivative gas turbine engine 100 may comprise an aero-derivative low pressure compressor section 132 and an aero-derivative low pressure turbine section 134 interconnected by an aero-derivative low pressure shaft 136. These components may be aero components if not modified when the aero-derivative gas turbine engine 100 is assembled. Alternately, they may be modified. There will be an aero high pressure compressor section 138 and an aero high pressure turbine section 140 interconnected by an aero high pressure shaft 142. The aero-derivative low pressure shaft 136 may be supported by aero-derivative low pressure shaft bearings 144, and the aero high pressure shaft may be supported by aero high pressure shaft bearings 146. High pressure shaft dynamics in aero gas turbine engines 60 and aero-derivative gas turbine engines 100 are critical to proper engine operation, and high pressure shaft dynamics and high pressure bearing design and configuration are directly influenced by shaft lengths. Consequently, being able to maintain the same high pressure shaft length provides a great advantage by avoiding changes to high pressure shaft dynamics.

Also shown in FIG. 4 is the aero-derivative combustor outer casing 108 comprising an aero-derivative combustor outer casing opening 148, which may be configured to permit access to a volume enclosed thereby. The aero-derivative combustor outer casing opening 148 may also be configured such that individual combustors 34 and an associated advanced transition duct 124 may be removed from the aero-derivative gas turbine engine 100 without a need for a major disassembly of the entire aero-derivative gas turbine engine 100.

Additionally, a power turbine 149 may be configured to receive exhaust from the aero-derivative gas turbine engine 100 and turn it into rotational energy. This may be done via a power turbine shaft 150 associated with the power turbine 149 and a generator 152 that may produce electricity. The power turbine shaft 150 may be separate from the aero-derivative low pressure shaft 136. In this case the aero-derivative low pressure shaft 136 may simply be an original aero low pressure shaft. The power turbine shaft 150 may be integral to the aero-derivative low pressure shaft 136. In this case the original aero shaft may be replaced with a longer, heavier duty aero-derivative low pressure shaft 136, and an additional aero-derivative low pressure shaft bearing 154 may be positioned downstream of the power turbine 149 to support the extra length. Alternately (not shown), the generator 152 may be disposed at the upstream end of the aero-derivative gas turbine engine 100 and in that case the aero-derivative low pressure shaft 136 may also be extended upstream to the generator 152. When the aero-derivative low pressure shaft 136 is extended upstream, the upstream-most aero-derivative low pressure shaft bearings 156 may be relocated to support the extra length.

Converting an aero gas turbine engine to an aero-derivative gas turbine engine may also include changing some or all of any adjustable compressor vanes within the aero compressor section 62 into a fixed position. Such adjustability may not be necessary in an aero-derivative gas turbine engine 100 for various reasons. Converting adjustable blades to fixed blades may be done in any manner known to those of ordinary skill in the art, including welding them in place, or locking any adjustment mechanism into a fixed position etc.

It is understood that during a retrofit of an aero gas turbine engine into an aero-derivative gas turbine engine, none of the high pressure compressor, the high pressure compressor, the high pressure shaft, or high pressure shaft bearings may be substantially redesigned. However, it is also understood that some or all of those components that are worn may be replaced with new components. The new component may be of the exact same design, or may be a different version (i.e. model or version) of the version present in the aero engine. Replacing any such part is considered within the scope of the disclosure so long as the new part does not involve a major redesign of the aero gas turbine engine core in order to accommodate the advanced combustion system. For example, a shaft with improved material properties may be used to replace an existing shaft and such a replacement would not considered a major redesign of the aero gas turbine engine.

Additionally, since the aero combustion system axial length 85 remains the same, the aero-derivative combustor outer casing 108 can be made to have a same axial length as the aero combustor outer casing 68, and be made to secure to the aero compressor outer casing 64 and the aero turbine outer casing 72 in the same way, and perhaps utilizing the same mounts. The net effect, when no modifications are made to the aero compressor outer casing 64 and the aero turbine outer casing 72, would be simply swapping the aero-derivative combustor outer casing 108 for the aero combustor outer casing 68. In addition, referring back to FIG. 3, the aero annular combustor inner casing 88 could be replaced with an aero-derivative combustor inner casing 129 with a larger diameter to permit access to an area enclosed therein.

Once assembled and operating, the aero-derivative gas turbine engine may also yield savings in terms of maintenance cost. Specifically, an aero annular combustor may require more frequent maintenance, and some of that maintenance may require shipping the aero annular combustor to a repair facility. Such a removal is very costly because it also may involve removal of the entire combustor outer casing as necessary to remove the large aero annular combustor. In contrast, with the aero-derivative gas turbine engine, each advanced combustion system may be individually removed and replaced without removing the combustor outer casing. Consequently, many maintenance operations may be accomplished with less effort and requiring less down time. In addition to the maintenance savings, the aero-derivative gas turbine engine may last longer, and generate fewer unwanted emissions. Even further, removing the first row of turbine vanes reduces parts costs and leakage losses related to the first row of turbine vanes. Consequently, the invention disclosed herein represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of making an aero-derivative gas turbine engine, the method comprising:
   removing a combustor outer casing of an existing aero gas turbine engine;
   removing an annular combustor of the existing aero gas turbine engine;
   removing a first row of turbine vanes of the existing aero gas turbine engine;
   installing a can annular combustor assembly within the existing aero gas turbine engine, the can annular combustor assembly configured to accelerate and orient combustion gasses directly onto a first row of turbine blades of the existing aero gas turbine engine, the can annular combustor assembly comprising a plurality of combustors and associated transition ducts; and
   installing a can annular combustor assembly outer casing to produce the aero-derivative gas turbine engine, wherein the can annular combustor assembly is installed within an axial span of the existing aero gas turbine engine vacated by the annular combustor and the first row of turbine vanes.

2. The method of claim 1, wherein the step of installing the can annular combustor assembly does not involve changing at least one component selected from a group consisting of a high pressure shaft of the existing aero gas turbine engine, and high pressure shaft bearings of the existing aero gas turbine engine.

3. The method of claim 1, comprising using compressor outer casing mounts of the existing aero gas turbine engine and turbine outer casing mounts of the existing aero gas turbine engine to secure the can annular combustor assembly outer casing to a compressor outer casing of the existing aero gas turbine engine and a turbine outer casing of the existing aero gas turbine engine.

4. The method of claim 1, comprising replacing a combustor inner casing of the existing aero gas turbine engine with a can annular combustor assembly inner casing of larger diameter to improve access to a volume enclosed thereby.

5. The method of claim 1, comprising converting an adjustable compressor vane of the existing aero gas turbine engine to a fixed compressor vane.

\* \* \* \* \*